US008474991B2

(12) United States Patent
Ortiz-Gavin

(10) Patent No.: US 8,474,991 B2
(45) Date of Patent: Jul. 2, 2013

(54) PHOTOGRAPHIC LIGHTING APPARATUS AND SYSTEMS

(76) Inventor: Sergio Alejandro Ortiz-Gavin, Los Angeles, CA (US)

(*) Notice: Subject to any disclaimer, the term of this patent is extended or adjusted under 35 U.S.C. 154(b) by 377 days.

(21) Appl. No.: 12/767,711

(22) Filed: Apr. 26, 2010

(65) Prior Publication Data

US 2010/0271820 A1    Oct. 28, 2010

Related U.S. Application Data

(60) Provisional application No. 61/172,305, filed on Apr. 24, 2009.

(51) Int. Cl.
G03B 15/02 (2006.01)
F21V 11/00 (2006.01)

(52) U.S. Cl.
USPC ...... 362/16; 362/8; 362/11; 362/18; 362/241; 362/242

(58) Field of Classification Search
USPC .............................. 362/8, 11, 16, 18, 241, 242
See application file for complete search history.

(56) References Cited

U.S. PATENT DOCUMENTS 5,050,946 A * 9/1991 Hathaway et al. .............. 385/33
5,651,602 A * 7/1997 Tawil et al. ..................... 362/18

* cited by examiner

*Primary Examiner* — Stephen F Husar
*Assistant Examiner* — James Cranson, Jr.
(74) *Attorney, Agent, or Firm* — Edward C. Schewe

(57) ABSTRACT

Light apparatus and systems to produce a diffused light source for stage, studio, motion picture and still photography. A tube constructed from selected proportions of diffusion material and reflective material is secured at opposite ends to light reflectors or light reflecting umbrellas with light sources. The light generated by the light sources is reflected off of the reflectors and is also reflected off of the reflective material of the tube to produce a desirable light dispersion pattern across the length of the diffusion material of the tube.

6 Claims, 6 Drawing Sheets

PHOTOGRAPHIC LIGHTING APPARATUS AND SYSTEMS

RELATED APPLICATION DATA

This application claims the benefit of U.S. Provisional Application Ser. No. 61/172,305 filed on Apr. 24, 2009 entitled Photographic Lighting Apparatus and Systems.

BACKGROUND OF THE INVENTION

1. Field of the Invention

The invention relates to lighting apparatus and systems for producing diffused light and particularly, apparatus and systems for producing light for stage, studio, motion picture and still photography.

2. Description of the Related Art

Many lighting techniques to create diffused lighting have been used for photography. However, these conventional techniques and systems are often unreliable and inefficient in a field that demands new and improved techniques. A need exists for new and improved apparatus, systems and methods that overcome the limitations in conventional lighting techniques and which reliably produce diffused light for stage, studio, motion picture and still photography.

SUMMARY OF THE INVENTION

Light apparatus and systems to produce a diffused light source for stage, studio, motion picture and still photography. The invention includes a tube that is at least partially constructed of diffusion material in selected proportions and which is secured at opposite ends to light reflectors or light reflecting umbrellas each with a light source.

The light generated by the light sources is reflected off of the reflectors and is also reflected off reflective material of the tube. The light is combined in a homogeneous, soft and even light dispersion pattern across the length of the diffusion material. Diffusion material placed in front of a light source scatters directional light that passes through the diffusion material scattering the light in a wide pattern.

The resulting light that passes through the diffusion material appears softer and homogeneous. This softer light has several advantages for photographers. The light appears more natural, more uniform or more like daylight with undesirable shadows being minimized or eliminated.

Other advantages are that the softer light conceals the fact that the subject being photographed is lighted by two or more sources in addition to generating a broader beam of light that allow photographers to light a larger area. One use of the invention would be a photography location where a large, soft and even light source is desirable, such as in confined areas, for example for photographing a car or other vehicle.

The tube is constructed of two portions with the first portion constructed from a reflective material and the second portion constructed from a diffusion material. The tube is attached to the reflectors by elastic bands and by spandex transition pieces that are sewn to the reflective material and the diffusion material.

The tube is stretched between two light reflectors and secured to the reflectors by the elastic bands and the spandex transition pieces. The light reflectors are parabolic or umbrella light reflectors with light sources and are known to persons skilled in the art. The light generated by the light sources is reflected off the reflective portion of the tube and off the reflectors and combined in a homogeneous, soft, even light dispersion pattern across the length of the diffusion material of the tube.

The light sources can be constant or flash lighting sources. The light sources can be the same type of light source or the light sources can be mixed. Examples of light sources that can be used include flash, HMI, tungsten, incandescent, xenon, halogen and L.E.D.'s. By mixing two different light sources having different color temperatures, a user is able to adjust the color temperature from 6200 K to 3000 K or by the use of colored gels adjust the color of the light by varying the power balance from one light source to the other light source. All light sources and the use of colored gels known to skilled persons are within the scope of the present invention.

The tube construction does not have to be constructed of equal portions of reflective material and diffusion material. The tube can be constructed from any combination of reflective material and diffusion material in embodiments of the invention. The invention includes embodiments with the tube 100% constructed from diffusion material. The invention includes embodiments with the tube constructed 10% from diffusion material and constructed from a larger percentage of reflective material such as 90%. All combinations of diffusion material and reflective material for use in constructing the tube are within the scope of the present invention.

Light weight, high temperature nonflammable materials are used for both the reflective material and the diffusion material. The materials used where the tube attaches to the reflectors are high temperature nonflammable materials. The materials and the thread used for sewing and constructing the tube are materials that can withstand high levels of ultraviolet light.

Further advantages and embodiments of the invention will be apparent to persons skilled in the art from the drawings and description set forth herein.

DETAILED DESCRIPTION OF THE INVENTION

Reference is made to the Figures in which elements of the illustrated embodiments of the invention are given numerical designations so as to enable one skilled in the art to make and use the invention. It is understood that the following description is exemplary of embodiments of the invention and it is apparent to skilled persons that modifications are possible without departing from the inventive concepts herein described.

Figure 1:
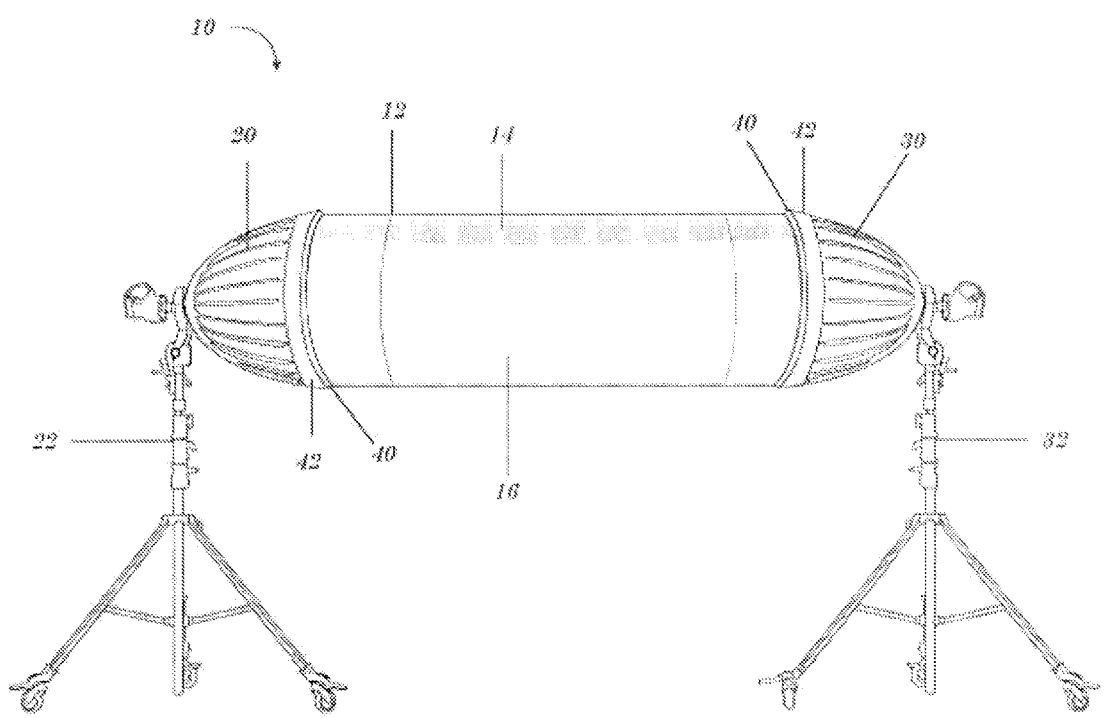
FIG. 1 is a front elevation view of an embodiment of the invention illustrating an arrangement of a tube and light reflectors.

Referring to FIG. 1, an embodiment of the photographic lighting apparatus 10 of the present invention is illustrated. The apparatus 10 includes the tube 12 stretched between and connected to a first reflector 20 and a second reflector 30 at the ends of the tube 12 as shown in FIG. 1.

The first reflector 20 includes a light source (not shown) in a conventional manner and is supported by a first support 22. The second reflector 30 includes a second light source (not shown) in a conventional manner and is supported by a second support 32.

Figure 2:
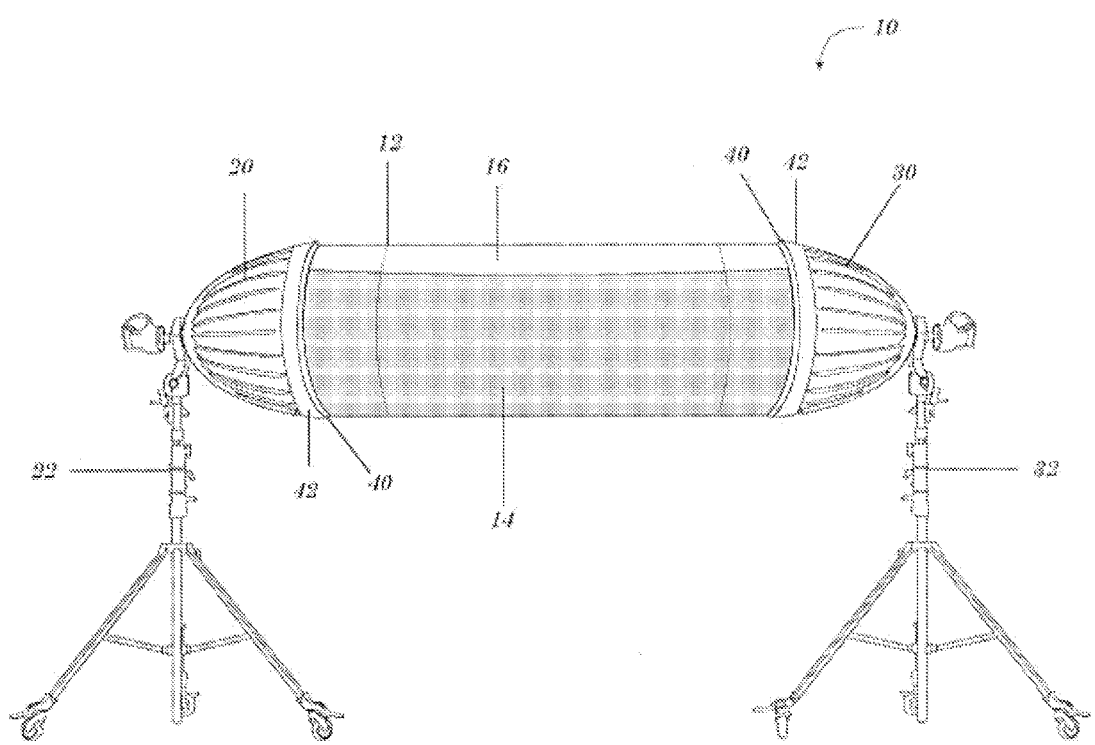
FIG. 2 is a rear elevation view of an embodiment of the invention.

As shown in FIG. 1 and FIG. 2, the tube 12 includes a portion constructed of a reflective material 14 and a portion constructed of a diffusion material 16. The reflective material 14 includes a thin aluminum metalized foil that is laminated to a black polyester backing material. The reflective material 14 includes other reflective materials that reflect light and include, but are not limited to, flat white textile or fabric materials and a multi-layered embossed carbon fiber material with a laminated metalized film, all of which are within the scope of the present invention.

The diffusion material 16 includes 100% raw silk. The diffusion material 16 includes other materials that transmit light and are known to skilled persons including, but not limited to, plastic, nylon, silk materials, paper, glass, cotton and muslin, all of which are within the scope of the present invention.

Figure 3:
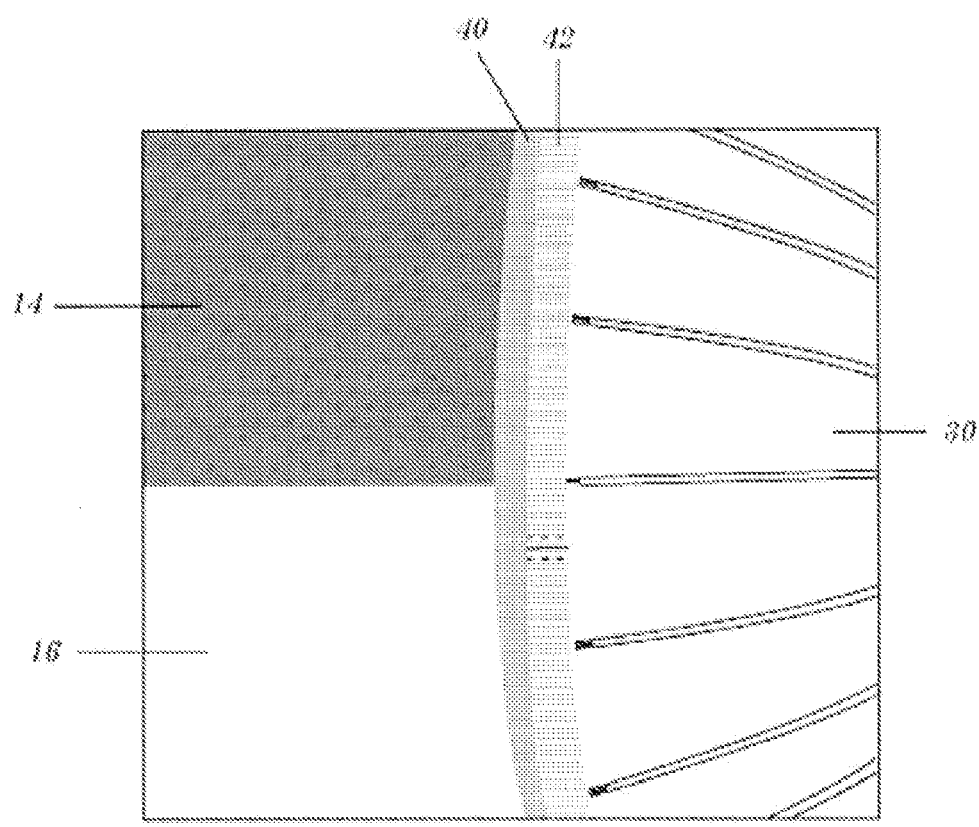
FIG. 3 is a partial side view illustrating a connection between the tube and a light reflector using an elastic band and a spandex piece.

FIG. 3 illustrates one embodiment showing a connection between the tube 12 and the reflector 30. An elastic band 40 is secured around a spandex piece 42 placed on the reflector 20 or 30 to connect the tube 12 to the reflector and to prevent light from coming out at these connections.

Figure 5:
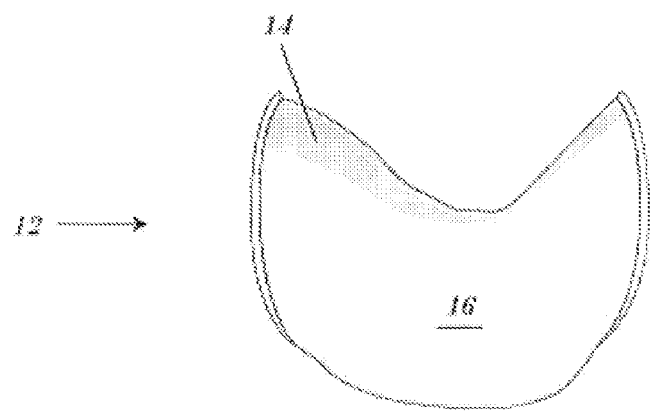
FIG. 5 is a side view of one embodiment of the tube.
Figure 6:
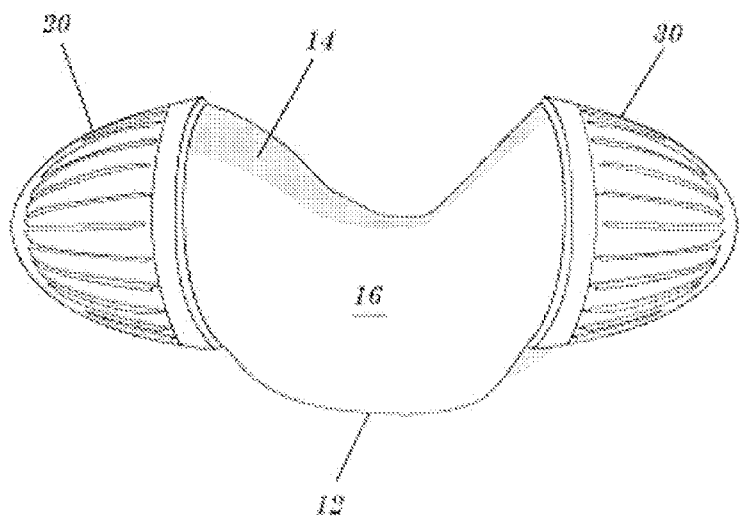
FIG. 6 is a side view illustrating one embodiment with the tube attached to light reflectors.
Figure 7:
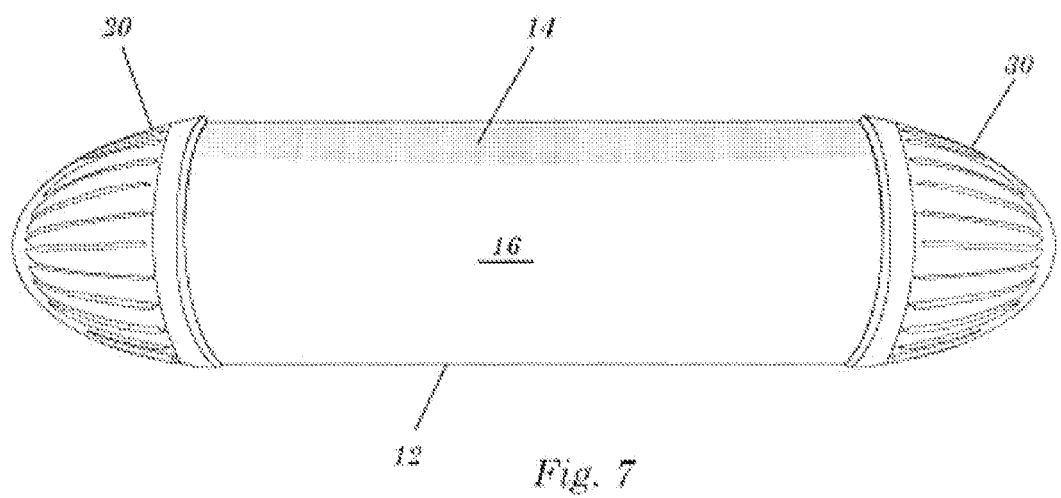
FIG. 7 is a side view illustrating an embodiment with the tube stretched between light reflectors.

FIGS. 5-7 illustrate one method for securing the tube 12 to the light reflectors 20 and 30. The tube 12 is initially unfolded from its storage location such as from a carrying bag as shown in one embodiment in FIG. 5. The reflectors 20 and 30 are arranged so that the reflective portions of the reflectors are generally facing each other. One end of the now unfolded tube 12 is attached to the reflector 20 and the second or other end of the tube 12 is attached to the reflector 30 as shown in FIG. 6. The reflectors 20 and 30 are then moved apart so that the tube 12 is stretched as shown in FIG. 7.

Figure 8:
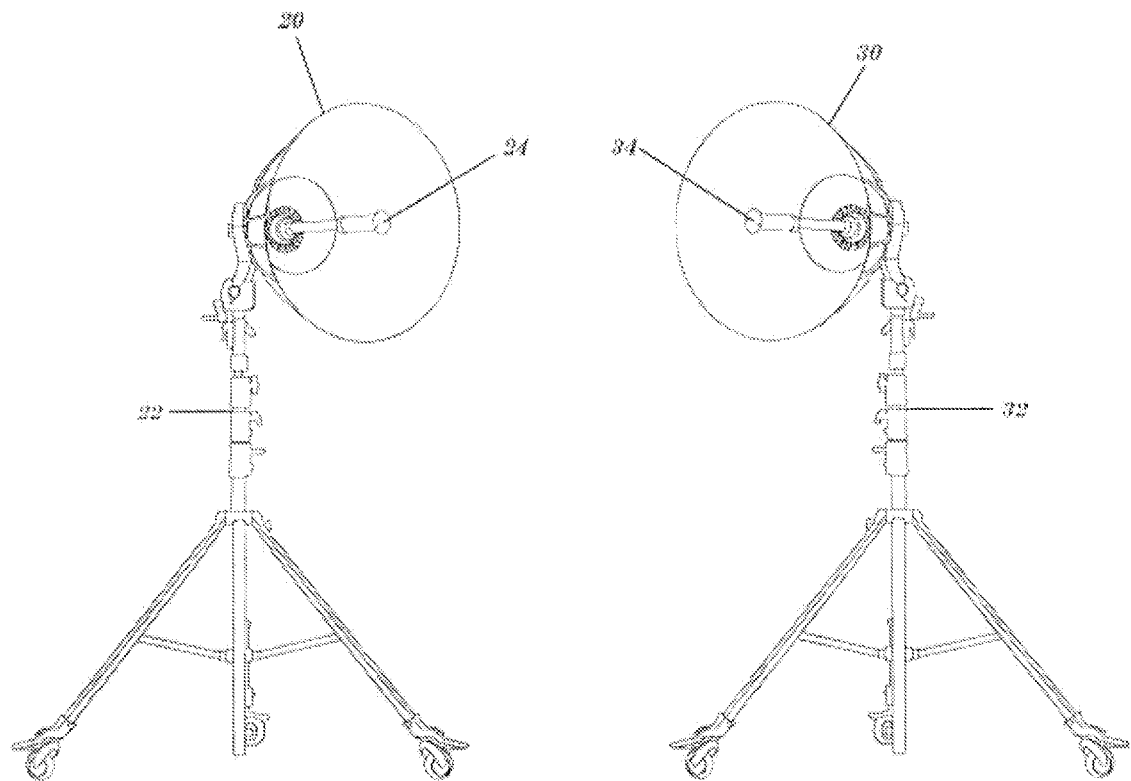
FIG. 8 is an elevation view of an embodiment of the invention showing a first light source and a second light source.

FIG. 8 shows an embodiment for illustrative purpose with the tube 12 removed showing a first light source 24 used with the first reflector 20 and a second light source 34 used with the second reflector 30.

Embossing. In embodiments of the invention, the reflective material 14 is produced by a multi-stage three dimensional embossing method. The embossing method increases the surface area of the reflective material 14 and dynamically alters the direction of the light reflected by the reflective material 14 to produce a highly desirable quality of light.

Figure 4:
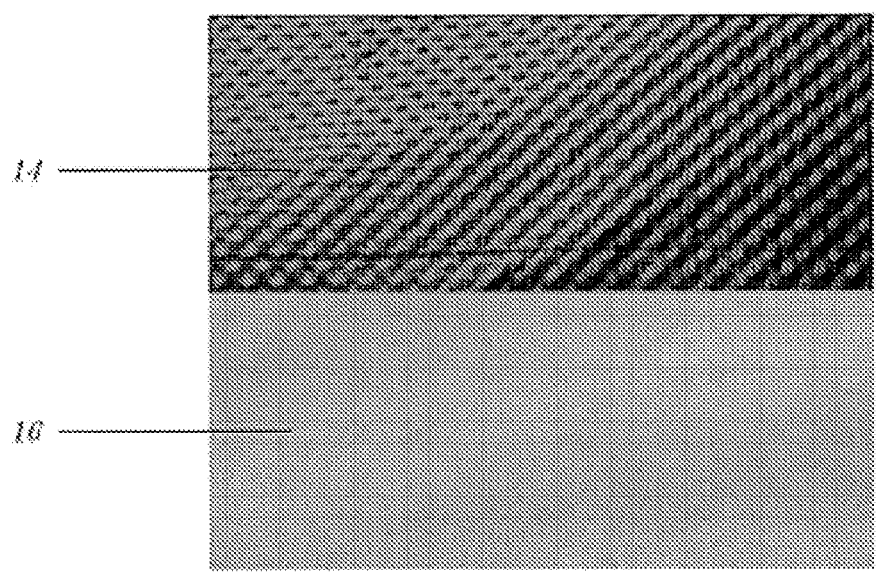
FIG. 4 is a partial side view illustrating an embodiment of the reflective material and the diffusion material for the tube.

In a first stage of the embossing method, the reflective material 14 is run through a set of fine rollers that imprint the material 14 with a fine textured pattern. In a second or subsequent stage, the material 14 is run through an embossing machine with an extremely aggressive matched set of rollers that imprint the material 14 with a deep coarse textured pattern. One embodiment of the textured pattern on the reflective material 14 is illustrated in FIG. 4 for one embodiment of the tube 12.

Multi-Layer Material. In embodiments of the invention, the reflective material 14 is manufactured from a laminated multi-layer textile material. In one or more of these embodiments, the multi-layer textile material includes six layers. For these embodiments, the first layer is a backing material. The backing material is made from aramid fibers, carbon fiber or a combination of heat resistant polyester fibers used to make a woven cloth, all of which are within the scope of the invention. In embodiments of the invention, the first layer is treated with a flame retardant.

The second layer is a high temperature black light blocking adhesive known to skilled persons and heat and pressure applied by conventional laminating machines also known to persons skilled in the art.

The third layer is a reflective foil which is made from a thin metalized film known to skilled persons. In embodiments of the invention, the reflective foil can be colorized.

The fourth layer is a clear, high temperature adhesive known to persons skilled in the art mixed with an iridescent opalescent coloring made from a combination of pigments.

The fifth layer is a high temperature clear plastic film selected from commercially available plastic films. High temperature plastics can be used also depending on the level of heat protection desired by the user, all of which are known to skilled persons.

The sixth layer is a layer of the iridescent opalescent coloring made from a combination of different pigments known to skilled persons.

The process described herein produces a material that can be described as having a translucent iridescent effect. The material has a depth of color reminiscent of the mother of pearl surface on the inside of an oyster shell or alternatively, the surface of a pearl or the surface of an opal.

While the present invention has been described with regards to particular embodiments, it is recognized that additional variations of the present invention may be devised by persons skilled in the art without departing from the inventive concepts disclosed herein.

What is claimed is:

1. An apparatus to produce diffused light comprising:
  a tube having it first end and a second end, the first end adapted to engage and cover a first light reflector having a first light source and the second end adapted to engage and cover a second light reflector having a second light source, the color temperature of the first light source is different than the color temperature of the second light source; and
  the tube formed from light reflecting material and light diffusion material so that when the first end of the tube engages and covers the first light reflector and the second end of the tube engages and covers the second light reflector, the light generated by the light reflectors is reflected of the light reflecting material of the tube and a light dispersion patient is produced through the light diffusion material of the tube.

2. An apparatus to produce diffused light comprising:
  a tube having a first end and second end, the first end adapted to engage and cover a first light reflector having a first light source and the second end adapted to engage and cover a second light reflector having a second light source; and
  the tube formed from light reflecting material and light diffusion material so that when the first end of the tube engages and covers the first light reflector and the second end of the tub engages and covers the second light reflector, the light generated by the light reflectors is reflected off the light reflecting material of the tube and a light dispersion pattern is produced through the light diffusion material of the tube, wherein the reflective material includes a textured pattern imprinted thereon.

3. An apparatus to produce diffused light comprising:
  a tube having a first end and a second end, the first end adapted to engage and cover a first light reflector having a first light source and the second end adapted to engage and cover a second light reflector having a second light source; and the tube formed from light reflecting material and light diffusion material so that when the first end of the tube engages and covers the first light reflector and the second end of the engages and covers the second light reflector, the light generated by the light reflectors is reflected off the light reflecting material of the tube and a light dispersion pattern is produced through the light diffusion material of the tube, wherein the tube is stretched between the first and second light reflectors and secured thereto by elastic bands and light blocking transition pieces.

4. An apparatus to produce diffused light comprising:

a tube having a first end and a second end, the first end adapted to engage and cover a first light reflector having first light source and the second end adapted to engage and cover a second light reflector having a second light source; and the tube formed from light reflecting material and light diffusion material so that when the first end of the tube engages and covers the first light reflector and the second end of the tube engages and covers the second light reflector, the light generated by the light reflectors is reflected off the light reflecting material of the tube and a light dispersion pattern is produced through the light diffusion material of the tube, wherein the light diffusion material forms substantially all of the tube.

5. An apparatus to produce diffused light comprising:

a tube having a first end and a second end, the first end adapted to engage and cover a first light reflector having a first light source and the second end adapted to engage and cover a second light reflector having a second light source; and the tube formed from light reflecting material and light diffusion material so that when the first end of the tube engages and covers the first light reflector and the second end of the tube engages and covers the second light reflector, the light generated by the light reflectors is reflected off the light reflecting material of the tube and a light dispersion pattern is produced through the light diffusion material of the tube, wherein the reflective material includes a laminated multi-layer textile material.

6. An apparatus to produce diffused light comprising:

a tube having a first end and a second end, the first end adapted to engage and cover a first light reflector having a first light source and the second end adapted to engage and cover a second light reflector having a second light source; and the tube formed from light reflecting material and light diffusion material so that when the first end of the tube engages and covers the first light reflector and the second end of the tube engages and covers the second light reflector, the light generated by the light reflectors is reflected off the light reflecting material of the tube and a light dispersion pattern is produced through the light diffusion material of the tube, wherein the reflective material includes a laminated multi-layer textile material and the laminated multi-layer textile material includes a reflective foil layer and a plastic film layer.

* * * * *